United States Patent [19]

Lisowyj et al.

[11] Patent Number: 4,643,110
[45] Date of Patent: Feb. 17, 1987

[54] DIRECT FUEL-FIRED FURNACE ARRANGEMENT FOR THE RECOVERY OF GALLIUM AND GERMANIUM FROM COAL FLY ASH

[75] Inventors: Bohdan Lisowyj, Omaha, Nebr.; David Hitchcock, Independence, Mo.; Henry Epstein, Omaha, Nebr.

[73] Assignee: Enron, Inc., Houston, Tex.

[21] Appl. No.: 882,762

[22] Filed: Jul. 7, 1986

[51] Int. Cl.⁴ .............................................. F23G 5/12
[52] U.S. Cl. ........................................ 110/229; 75/25; 75/84; 110/204; 110/215; 110/247; 266/147; 266/154; 266/156
[58] Field of Search .................................. 110/203–206, 110/210–212, 215, 229, 230, 233, 235, 247, 275, 315, 342, 344, 345, 347; 55/68, 73; 75/25, 84; 266/144, 146–148, 152, 154, 156, 157

[56] References Cited

U.S. PATENT DOCUMENTS

| | | | |
|---|---|---|---|
| 3,958,919 | 5/1976 | Kjell-Berger | 266/156 X |
| 4,076,504 | 2/1978 | Oshida et al. | 110/345 X |
| 4,235,425 | 11/1980 | Beggs et al. | 266/147 |
| 4,270,740 | 6/1981 | Sanzenbacher et al. | 266/157 |
| 4,366,759 | 1/1983 | Foresto | 110/247 X |
| 4,475,993 | 10/1984 | Blander et al. | 75/25 X |
| 4,488,905 | 12/1984 | Santen | 266/154 X |
| 4,579,067 | 4/1986 | Peters | 110/235 |

FOREIGN PATENT DOCUMENTS

81/01873  7/1981  PCT Int'l Appl. ................. 110/347

Primary Examiner—Albert J. Makay
Assistant Examiner—Steven E. Warner
Attorney, Agent, or Firm—Zarley, McKee, Thomte, Voorhees & Sease

[57] ABSTRACT

A furnace arrangement utilizes a single vertically disposed shaft furnace incorporating the features of pellet drying and hardening, oxidizing heat-up, reducing roast and gas separation. The upper portion of the furnace dries and hardens "green" pellets while at the same time subjecting them to an oxidizing atmosphere and temperature increase. A stack of the pellets slowly moves downwardly through a transistion zone to a reducing atmosphere in a lower portion of the furnace. A heated reducing gas circulates through this lower portion and out of the furnace through a recovery system of the furnace arrangement. After the sublimate carried by the reducing gas is removed, the reducing gas is supplemented and returned to the lower portion of the furnace to again produce a reducing atmosphere. A smaller branch of cooled reducing gas enters the lower portion of the furnace adjacent the bottom to cool the pellet residue immediately prior to removal from the furnace.

7 Claims, 1 Drawing Figure

DIRECT FUEL-FIRED FURNACE ARRANGEMENT FOR THE RECOVERY OF GALLIUM AND GERMANIUM FROM COAL FLY ASH

TECHNICAL FIELD

The present invention relates generally to a furnace arrangement utilized in recovering trace minerals from coal fly ash, and more specifically to an improved furnace arrangement incorporating oxidizing heat-up, reducing roast and gas separation in a single furnace.

BACKGROUND OF THE INVENTION

In utility and industrial boilers burning coal, fly ash is produced. Electrostatic precipitators, wet scrubbers, bag houses or other recovery equipment are used to remove the fly ash particulates from the combustion gases. In general, the fly ash is composed of fine grained particles having a silica-alumina base with certain of trace metals concentrated on the surfaces of the particles. Some of these trace metals are valuable, including molybdenum, tungsten, nickel, gallium, and germanium. Others, such as arsenic, lead and antimony, are toxic.

Numerous attempts have been made in the past to recover certain of the trace metals present in fly ash, particularly gallium and germanium. One such method is the sublimation of these trace metals. The process involved the following steps: (1) the fly ash is pelletized and then dried and hardened so that the pellets can be stacked on top of each other within the furnace; (2) the pellets are then heated in a furnace in an oxidizing atmosphere; (3) the pellets are then subjected to a reducing atmosphere, causing the gallium and/or germanium to sublime and be carried away by the reducing gas—thereby separating the sublimate from the pellet residue; (4) the sublimate is then recovered from the reducing gas, the reducing gas being reused in the reducing atmosphere; and (5) the pellet residue is cooled and removed from the furnace.

It is therefore an object of this invention to provide an improved furnace arrangement for the recovery of trace metals from fly ash.

Another object of this invention is to provide a furnace arrangement capable of continuous operation in the recovery of the trace metals from fly ash.

Yet another object of the invention is to reduce the number of separate steps necessary to recover trace metals from fly ash, thereby decreasing the cost and improving the efficiency of the process.

SUMMARY OF THE INVENTION

A furnace arrangement is described which utilizes a single vertically disposed shaft furnace incorporating the features of pellet drying and hardening, oxidizing heat-up, reducing roast and gas separation. The upper portion of the furnace dries and hardens "green" pellets while at the same time subjecting them to an oxidizing atmosphere and temperature increase. A stack of the pellets slowly moves downwardly through a transition zone to a reducing atmosphere in a lower portion of the furnace. A heated reducing gas circulates through this lower portion and out of the furnace through a recovery system of the furnace arrangement. After the sublimate carried by the reducing gas is removed, the reducing gas is supplemented and returned to the lower portion of the furnace to again produce a reducing atmosphere. A smaller branch of cooled reducing gas enters the lower portion of the furnace adjacent the bottom to cool the pellet residue immediately prior to removal from the furnace.

BRIEF DESCRIPTION OF THE DRAWINGS

The drawing shows a cross-sectional view of the furnace arrangement of the invention—the recovery portion, and other related portions, being in schematic form.

DESCRIPTION OF THE PREFERRED EMBODIMENT

Figure 1:
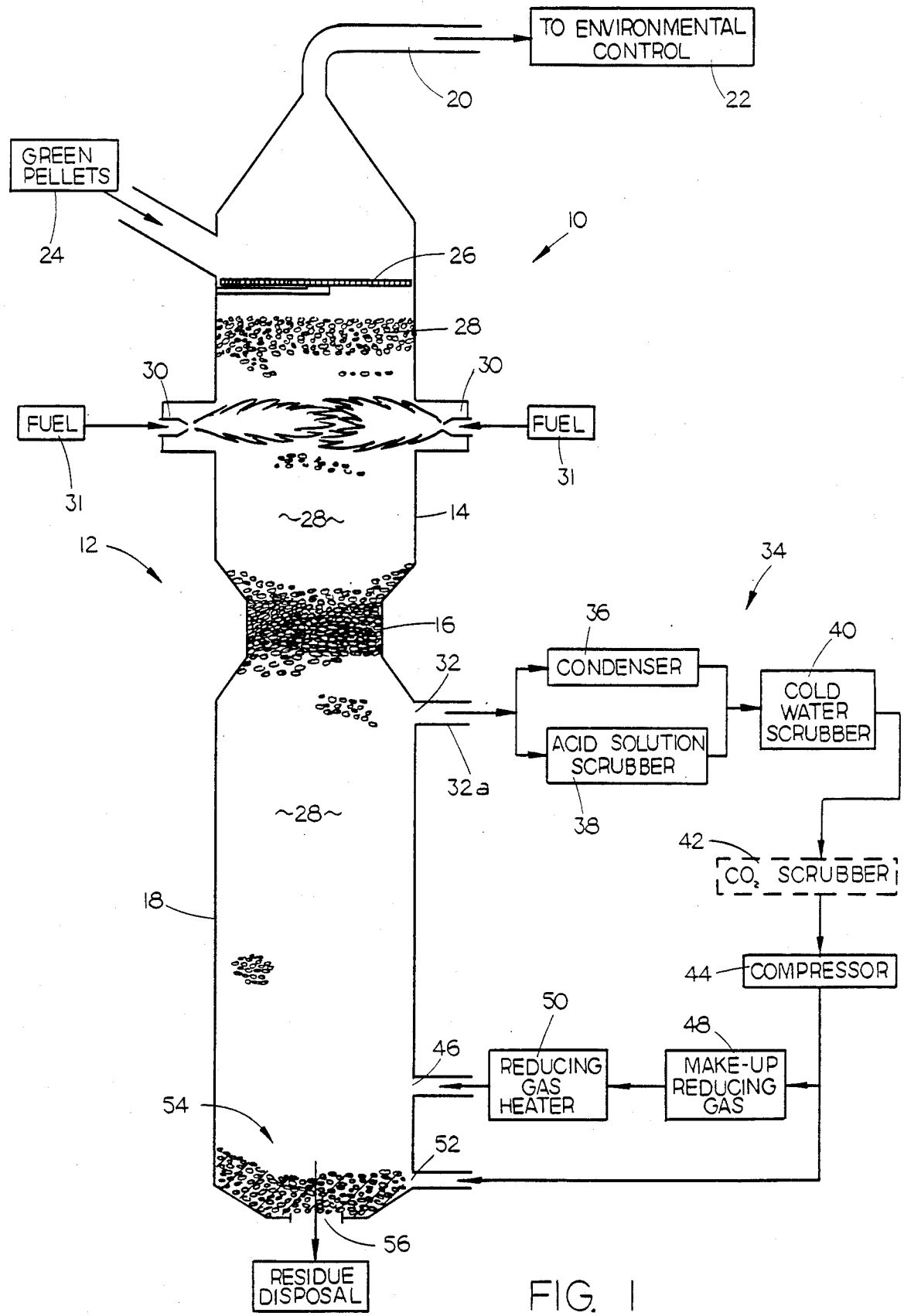

Referring now to the drawing, the furnace arrangement of this invention is designated generally at 10, and includes a vertically disposed shaft furnace 12 which has an upper portion 14, a transition zone 16 and a lower portion 18.

Upper portion 14 of shaft furnace 12 is designed to incorporate the steps of drying and hardening "green" pellets, oxidizing of the pellets, and heat-up of the pellets to a temperature near their fusion point. Furnace upper portion 14 includes an exhaust flue 20 which carries the oxidizing and combustion gases from the upper chamber to an environmental control center 22 for further processing.

A charge of green pellets 24 is deposited on a rotating screen 26 within the upper furnace chamber for drying and hardening. "Green" pellets require some hardening and drying in order to strengthen the pellet to support its own weight within a stack of pellets in the shaft furnace 12.

As green pellets 24 dry and harden they are dropped from screen 26 onto the top of a stack of hardened pellets 28, which slowly move downwardly through the furnace 12. The upper portion 14 of shaft furnace 12 utilizes direct fired combustion to heat and oxidize pellets 28. A flame source 30 on each side of upper portion 14 injects the combustion flames from the sides. The oxidizing gases are obtained from the combustion products of the fuel 31 (carbon dioxide, oxygen and water vapor), and cause the removal of arsenic and sulfur (toxic materials) from the fly ash pellets. The length of time that the pellets remain in the oxidizing atmosphere of furnace upper portion 14 is determined by the descent rate of the stack of pellets through the shaft furnace 12.

As pellets 28 descend from the upper portion 14, they are forced to compact slightly in the transition zone 16 of shaft furnace 12. The sides of furnace 12 are constricted slightly in the transition zone in order to cause this compaction. The purpose for this compaction is described in more detail hereinbelow.

As pellets 28 pass through transition zone 16, they enter the furnace lower portion 18 wherein the side walls again take on their original diameter to allow the flow of gases to more easily circulate. In furnace lower portion 18, pellets 28 are subjected to a reducing atmosphere, which will reduce the oxides in the pellets to suboxides which are much more volatile. The suboxides then sublime and are carried by circulating reducing gas out of shaft furnace 12 via outlet port 32 and tube 32a to a recovery system designated generally at 34.

As mentioned above, the furnace side walls within transition zone 16 cause pellets 28 to compact slightly. The compaction of the pellets 28 serves to form a kind of barrier to the reducing gases in lower portion 18. The gases within lower portion 18 will flow along the path of least resistance, which would be through outlet port 32 in the side wall of lower portion 18 rather than the more restrictive flow through the compacted pellets 28 and transition zone 16. Without such a barrier to the gases in the lower portion, the oxidation atmosphere would be partially neutralized by the reducing gases. More important, however, would be the loss of reducing gas containing sublimate products through the exhaust flue 20.

In recovery system 34, the suboxides of the trace metals, in the form of sublimate products, are recovered from the reducing gas. This can be done by condensing the suboxides on the cool surface of a condenser 36, such as a "cold finger" or some other such device. Another method for removing the suboxides from the gas would be to scrub the gas with a cold liquid solution which would dissolve them, such as a dilute acid in a scrubber 38. The reducing gas then passes to a cold water scrubber 40 which removes any remaining water vapor in the reducing gas.

If the composition of the reducing gas includes a mixture of carbon dioxide, then a carbon dioxide scrubber 42 is necessary to remove any remaining gas from the reducing gas. The reducing gas then passes to a compressor 44 which pushes the gas back to the shaft furnace 12 through an inlet port 46, thereby creating the general circulation utilized to move the gases through the recovery system 34 and through furnace lower portion 18.

The majority of the cleaned reducing gas circulated by compressor 44 is mixed with an additional supply of reducing gas in a make-up chamber 48. The newly made-up reducing gas is then heated, as shown at 50, before being returned to furnace lower portion 18 via port 46. The reducing gas heater 50 may be a conventional tube furnace, or the gas may be heated by the partial oxidation of the reducing gas as it moves toward shaft furnace 12. In the latter case, an in-line burner may be used to cause partial oxidation—an exothermic reaction—thereby raising the temperature of the gas.

A portion of the gas from compressor 44 will be injected directly into the lowest portion of the furnace 12 through an inlet port 52. This cool gas will serve to cool pellet residue 54 as it leaves shaft furnace 12 through an opening 56 in the bottom thereof. Since the cool reducing gas will simultaneously gain heat in this process, it will easily mix with the heated reducing gas entering via inlet port 46 without significantly decreasing the temperature of the gas. Pellet residue 56 is then disposed of in a conventional manner.

It can therefore be seen that the disclosed furnace arrangement fulfills at least all of the objectives described above.

We claim:

1. A furnace arrangement for the recovery of gallium and germanium from pelletized fly ash, comprising:
   a vertically disposed shaft furnace;
   said furnace having an upper portion with means for heating the contents thereof in an oxidizing atmosphere;
   said furnace upper portion adapted to receive a continuous charge of "green" pelletized fly ash;
   said furnace having a lower portion with means for subjecting the contents thereof to a reducing atmosphere;
   said furnace having a transition portion between said upper and lower portions, said transition portion having barrier means for hindering the flow of gases from said lower portion to said upper portion, whereby said oxidizing and reducing atmospheres are effectively segregated;
   said furnace lower portion having an outlet port in the upper part of its wall for carrying reducing gas from said furnace lower portion to an adjacent recovery system;
   said furnace lower portion having a first inlet port in a lower part of its wall for conveying reducing gas to said furnace lower portion; and
   said furnace lower portion having an opening in the bottom thereof adapted to continuously discharge pellet residue therefrom.

2. The furnace arrangement of claim 1, wherein the means for heating said furnace upper portion is a direct fire combustion means mounted in the wall thereof, and wherein the oxidizing gases are obtained from the combustion products of the fuel.

3. The furnace arrangement of claim 1, wherein said barrier means comprises inwardly directed furnace walls which decrease the interior diameter of said furnace within said transition portion, said inwardly directed walls slightly compacting a stack of fly ash pellets descending through said furnace.

4. The furnace arrangement of claim 1, wherein a recovery system is connected to said outlet port and said first inlet port, said recovery system comprising:
   means for recovering sublimate from reducing gas drawn from said outlet port;
   means for completely cleaning the reducing gas from said means for recovering sublimate, whereby the cleaned reducing gas may be reused in the furnace lower portion;
   means for circulating gas from said furnace lower portion through said outlet port, through said recovery system, and back into said furnace lower portion through said first inlet port;
   means for charging said cleaned reducing gas with additional reducing gas; and
   means for heating the cleaned and additional reducing gas to be injected through said first inlet port into said furnace lower portion.

5. The furnace arrangement of claim 1, further comprising pellet-holding means mounted within the furnace upper portion for holding pellets a predetermined period of time, said holding means adapted to drop said pellets onto a stack of hardened pellets within the furnace after said predetermined period of time, whereby the green pellets will dry and harden before being added to the pellet stack.

6. The furnace arrangement of claim 1, wherein said furnace lower portion has a second inlet port for conveying cool reducing gas to said lower portion, said second inlet being located adjacent the bottom of said lower portion whereby pellet residue therein is cooled prior to discharge from the furnace.

7. The furnace arrangement of claim 6, wherein a recovery system is connected to said outlet port and said first and second inlet ports, said recovery system comprising:
   means for recovering sublimate from reducing gas drawn from said outlet port;
   means for completely cleaning the reducing gas from said means for recovering sublimate, whereby the cleaned reducing gas may be reused in the furnace lower portion;

means for circulating gas from said furnace lower portion through said outlet port, through said recovery system, and back into said furnace lower portion through said first inlet port;

means for conveying a portion of the cleaned reducing gas through said second inlet port;

means for charging said cleaned reducing gas with additional reducing gas; and means for heating the cleaned and additional reducing gas to be injected through said first inlet port into said furnace lower portion.

* * * * *